United States Patent Office 3,414,530
Patented Dec. 3, 1968

3,414,530
GRAFT POLYMERS OF POLYALKYLENE OXIDES ON STARCH AND DEXTRIN
Albert Zilkha, Jerusalem, Menashe Tahan, Beersheba, and Gabriel Ezra, Haifa, Israel, assignors to the United States of America as represented by the Secretary of Agriculture
No Drawing. Filed Feb. 24, 1966, Ser. No. 529,669
Claims priority, application Israel, Dec. 23, 1965, 24,857
9 Claims. (Cl. 260—9)

ABSTRACT OF THE DISCLOSURE

Graft copolymers of polyalkylene oxides on starch and dextrin polysaccharides having utility as adhesives, emulsifiers and thickeners are prepared by reacting under aprotic conditions the alkali metal alkoxide derivative of the polysaccharide with one or more of the alkylene oxides.

---

A nonexclusive, irrevocable, royalty-free license in the invention herein described, throughout the world for all purposes of the United States Government, with the power to grant sublicenses for such purposes, is hereby granted to the Government of the United States of America.

The present invention relates to an anionic polymerization process for the preparation of novel grafted copolymers of one or more polyalkylene oxides with polysaccharides, e.g., starches, dextrins, amylose, and amylopectin, the polyalkylene oxides being those formed during the grafting reaction from monomeric aliphatic or aromatic alkylene oxides or dialkylene oxides having from 2 to 10 carbon atoms. The method for preparing our improved polyalkylene oxide graft copolymers involves first forming the polysaccharide alkoxide by known methods, e.g., by reacting the polysaccharide preferably with an alkali metal addition compound of a polycylic aromatic hydrocarbon, such as naphthalene or anthracene in an aprotic solvent as taught by Paul et al., JACS 78: 116 (1956) and in Israeli patent application S.N. 19,379, filed June 10, 1963, and under aprotic conditions reacting the alkali metal alkoxide derivative of the polysaccharide with one or more of the alkylene oxides.

The reaction of aqueous dispersions of starch with alkylene oxides such as ethylene oxide in the presence of alkali have been extensively studied and the resulting partially etherified hydroxyalkyl derivatives of starch are well known; see Ziese, German Patent 235,235, Kesler et al., U.S. Patent 2,516,632, and Kesler et al., U.S. Patent 2,516,633. Similar etherifications of flour are taught by Rankin et al., U. S. Patent 2,900,268, and by Lancaster et al., Cereal Chem. 37: 189 (1960). Kesler et al., U.S. Patent 2,845,417 teaches the etherification of starch with ethylene oxide by reaction in an alcoholic medium. The obtained starch ethers were soluble in water but not in alcohol.

According to the present invention our novel alkylene oxide graft polymers and copolymers are produced by reacting an alkylene oxide under essentially aprotic conditions with an alkoxide derivative of the starch dextrin, or related polysaccharide. The reaction in the case of ethylene oxide and the starch alkoxide may be represented as follows:

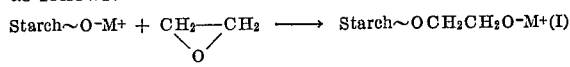

M designates an alkali metal cation, preferably potassium, although the sodium, lithium, cesium, or quaternary ammonium alkoxides, e.g., trimethyl benzyl ammonium alkoxide are operative.

This reaction comprises the initiation step of the graft polymerization. Since in the present invention the reaction is carried out under aprotic conditions, no pre-exhaustion termination of the anionic polymerization occurs and the ethylene oxide or other alkylene oxide present will add to the polysaccharide alkoxide formed, which is the propagation of the polymerization:

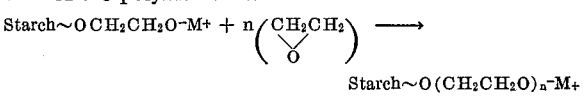

In the prior art reactions of alkylene oxides with starch in the presence of aqueous or alcoholic alkalis, only partially etherified starches are formed because of the protonation of the alkoxide formed in the depicted initiation step:

Starch~$OCH_2CH_2O^-M^+$ + $H_2O$ or ROH → Starch
~$OCH_2CH_2OH$ + MOH or MOR

According to the present invention it is possible not only to obtain graft polymers of polyalkylene oxides on starch and dextrin, but also to obtain graft copolymers of polyalkylene oxide side chains on starch and dextrin. It is also possible to precisely control the number and the length of the grafted polyalkylene oxide side chains. Reaction of the specific polysaccharide alkoxide derivative with a mixture of two or more alkylene oxides will lead to the formation of polyalkylene oxide side chains composed of the several alkylene oxides.

Since our graft polymerization is carried out under aprotic conditions, the propagating chain ends ($\sim O^-M^+$) are essentially free of terminating influences and remain "living" in the sense described by Szwarc: Fortschr. Hochpolymer Forsch. 2: 281 (1960). This fact is utilized for the preparation of block graft copolymers. For example, a block graft copolymer of starch having both polyethylene oxide and polypropylene oxide side chains may be obtained as follows:

The starch alkoxide derivative is reacted first with ethylene oxide under aprotic conditions to produce a starch-polyethylene oxide graft polymer having alkoxide end groups that can initiate further polymerization of additional alkylene oxide. Thus, the subsequent addition of propylene oxide then leads to the formation of block graft copolymers composed of starch-polyethylene oxide-polypropylene oxide which may be written tentatively as follows:

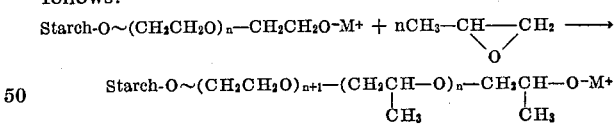

Similarly, starch-polypropylene oxide polyethylene oxide block graft copolymers are obtained by reversing the additions of the alkylene oxides.

In nonterminated (living) polymerization, the degree of polymerization is known to be proportional to monomer/initiator, see Szwarc et al., JACS 78: 2656 (1956); R. Waack et al., ibid. 79: 2026 (1957).

According to the present invention it is also possible to control the number and the length of the grafted side chains by controlling the monomer and the alkoxide concentrations. Thus, on using the same polysaccharide alkoxide concentration but increasing the concentration of alkylene oxide monomer, polyalkylene oxide side chains having a higher degree of polymerization are formed. This fact is important since the properties of the graft polymer depend on the number of grafted side chains and their length. It is also possible by the present invention to use ratios of monomer to initiator of less than unity to obtain only hydroxyalkyl or hydroxyaryl derivatives of starch and dextrin.

According to the present invention the reaction of the alkoxide derivatives of the starch or dextrin with the alkylene oxides may be carried out in solution or insuspension in suitable aprotic solvents, e.g., ethers such as tetrahydrofuran, dioxane, dimethyl sulfoxide, dimethylformamide and the like.

In dimethylsulfoxide, which is a good solvent for starches and dextrins, the graft polymerization of the alkylene oxide on the alkoxide derivatives proceeds very smoothly and easily. The preparation of the alkoxide derivates of starch and dextrin in a state which is suitable for subsequent anionic graft polymerization of an alkylene oxide is a difficult matter. Any method which will leave water, alcohol, or alkali residues together with the alkoxide derivative is unsuitable for graft polymerization. Water or alcohol residues will cause termination of the anionic graft polymerization by their acidic hydrogen while alkali residues will lead to initiation of polymerization of added monomer in the same way as the starch alkoxide, and thus lead to the formation of unwanted homopolymers, with loss of monomer and troublesome separation and purification of the graft polymers free of homopolymers.

The starch alkoxide formed by reacting starch with sodium isopropoxide in isopropanol is unsuitable for anionic graft polymerizations apparently because even traces of alcohol inhibit and terminate the reaction. Similarly, ammonia residues accompanying the alkoxide obtained by reacting starch with alkali metal dissolved in liquid ammonia, see Muskat, JACS 56: 693 (1934), interfere with the desired graft polymerization and the use of extremely low polymerization temperatures is required.

In the present invention we react an alkylene oxide under aprotic conditions with an alkali metal alkoxide derivative of starch or dextrin formed by reacting a suitable dispersion or suspension of the polysaccharide with THF solution of the addition compound of an alkali metal and a polycyclic aromatic hydrocarbon such as naphthalene or anthracene, which polysaccharide alkoxides are described in our Israeli patent application No. 19,379, filed June 10, 1963. The stoichiometric reaction proceeds as follows, each molecule of the alkali metal naphthalene metallizing one hydroxyl group of the polyhydroxy polymer.

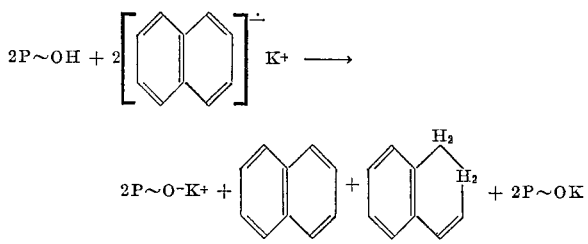

When the polyhydroxy polymer is in solution, the reaction is completed almost immediately as shown by the disapperance of the strong green color of the alkali metal naphthalene compound.

The use of the aforesaid polysaccharide alkali metal alkoxide derivatives for grafting with the alkylene oxides also have the following advantages:

(1) It is possible to graft polymerize directly, since no residual catalyst is present that can cause homopolymerization of the alkylene oxide.
(2) The byproducts of the metallization reaction are limited to polycyclic hydrocarbons and their dihydro derivatives, which do not interfere with the subsequent graft polymerizations.
(3) It is possible to convert a certain definite fraction of the hydroxyl groups of the polyhydroxy polymer by the addition of a readily calculated quantity of the alkali metal polycyclic hydrocarbon, measured from a solution and standardized by acid-base titration. This is especially advantageous since the concentration of the initiator largely determines the degree of polymerization of the resulting polymers.

For example, a preferred initiator is prepared by reacting a water-free DMSO solution of starch with a THF or dioxan solution containing about 0.15–1.8 moles of alkali metal naphthalene or anthracene addition product per 100 g. of dissolved starch, to avoid the formation of KOH.

The present invention encompasses a wide variety of starches which may be used in the preparation of our novel alkylene oxide-starch graft polymers and copolymers. Starches derived from wheat, corn, potato, rice and the partially degraded (soluble) starches are included as are amylose and amylopectin isolated therefrom.

The present invention also includes grafts of the white, canary, and other dextrins.

A wide range of alkylene oxides and dialkylene oxides, aliphatic and aromatic, and having from 2 to 10 carbon atoms may be grafted on the polysaccharides in accordance with our invention.

Examples of operative aliphtic alkylene oxides include ethylene oxide, propylene oxide, butylene oxide and butadiene monoepoxide. Examples of operative aromatic oxides include styrene oxide and phenylglycidyl ether.

As examples of diepoxides, there are butadiene diepoxide and vinyl cyclohexene diepoxide.

Alkylene oxides having substituents in the alkyl or aryl side chains are also included, e.g., epichlorohydrin.

The dialkylene oxides lead to the formation of crosslinked graft polymers, due to the presence of the two alkylene oxide groups. Addition of dialkylene oxides to graft polymers of monoalkylene oxides on starch and dextrin, where the side chains are still active, i.e., having $\sim O^-M^+$ end groups, also leads to crosslinking of the resulting graft copolymers.

In the case of epichlorohydrin the presence of the reactive chlorine also causes crosslinking.

The graft polymers of polyalkylene oxides on starch and dextrin have different solubilities based on the properties of the polymer backbone, i.e., the polysaccharide variety and on the type, length and number of side chains.

The lower alkylene oxides such as ethylene, propylene and butylene oxide lead to the formation of graft polymers having a wide range of solubility. The high contents of polyethylene oxide on polypropylene oxide in our starch graft polymers apparently provide a greatly increased solubility in water, i.e., about 20–30 g./100 ml. cold water, the ethylene oxide starch grafts generally being somewhat more soluble in water than the corresponding grafts with propylene oxide. The correspondingly grafted graft polymers on dextrins are even more soluble, i.e., 20–60 g./100 ml. of cold water.

Unlike starch and dextrin, our graft polymers and copolymers are soluble in ethanol and even more so in methanol, 10–30 percent solutions being readily obtained without heating, clear, strong films being obtained by casting from these solutions. Excepting with respect to water, our graft copolymers with polypropylene oxide are generally more soluble than those with polyethylene oxide.

Our graft polymers are also soluble in dimethylsulfoxide. Graft polymers of polyethylene oxide and starch having a relatively high percentage of polyethylene oxide side chains are soluble in chloroform. Those having a lower polyether content proved to be only partially soluble.

The graft polymers especially of the lower polyalkylene oxides such as polyethylene or polypropylene oxide can, if desired, be insolubilized merely by excessive heating of their aqueous or alcoholic solutions. Graft polymers having a higher content of the polyalkylene oxide are more prone to such insolubilization.

Graft polymers with aromatic alkylene oxides were found to be much less soluble in water than the corresponding graft polymers formed from the lower alkylene oxides.

The melting points and softening temperatures were also dependent on the content of the polyalkylene oxide of the graft polymer. For example, our graft polymers of polyethylene oxide on soluble, i.e., commercial acid modified starch melted between 50–220° C. Graft polymers of polypropylene oxide on soluble starch melted at from 60–70° C. to as much as about 200° C.

Based on this wide range of solubility and film forming properties, the graft polymers encompassed in the present invention have a wide variety of uses as adhesives, emulsifiers and thickeners.

Specific embodiments of this invention are described in the following examples. These examples are merely illustrative, however, and should not be considered as implying any limitations of the scope of this invention.

The strongly green potassium naphthalene catalyst solution employed in the following examples was prepared under argon in a 1,000 ml. Erlenmeyer flask having a side opening fitted with a self-sealing rubber cap. Naphthalene was dissolved in purified tetrahydrofuran in an amount sufficient to provide a 1.0–1.5 N solution, and an equivalent amount of potassium was added. After several hours of magnetic stirring, titration of an aliquot with standard acid verified the potassium naphthalene concentration as having reached the theoretical value with a deviation of ±3 percent.

The stock solution of soluble starch in dimethylsulfoxide was prepared in a three-necked 3-liter flask equipped with a high speed stirrer and a Dean-Stark trap containing benzene. To 1,500 ml. of DMSO was very slowly added 70.6 g. of soluble starch containing 15% moisture. The starch suspension resulting from vigorous stirring was heated slowly with a heating mantle until it dissolved completely. After cooling the solution to about 40–50° C. and slowly adding 300 ml. of dry benzene, the mixture was refluxed azeotropically for about 3 days until all of the theoretical water was removed. Then with the Dean-Stark trap substituted for downward distillation under vacuum, the benzene was removed.

Example 1

All reagents were dried before use, and the reaction carried out under a nitrogen or argon atmosphere.

A 4.86 percent stock solution of commercially available soluble starch in dimethylsulfoxide (DMSO) was prepared and dried by azeotropic distillation with benzene, as previously described.

50 ml. of this solution containing 2.43 g. starch was transferred under anhydrous conditions to a three-necked flask fitted with a high speed stirrer, a thermometer and an inlet for argon.

Potassium naphthalene, 9.5 ml. of 0.98 N solution (9.3 mmole), in tetrahydrofuran was added with stirring. The green color of the potassium naphthalene disappeared after 2–3 minutes due to formation of the alkoxide groups on the starch, and due to the gel nature of the resulting starch alkoxide, the viscosity of the solution increased. The starch alkoxide solution was cooled to 3–5° C. and ethylene oxide (2.4 g.; 54.5 mmole) was bubbled in. The ratio of ethylene oxide monomer to the alkoxide was 5.86. The reaction mixture was stirred for 1 hour and then left to stand at room temperature overnight; then it was diluted with about 70 ml. dry benzene, and about 120 ml. of dry petroleum ether was added to precipitate the ethylene oxide grafted starch ether. The mixed solvent was decanted off, the precipitate diluted with benzene, precipitated again with petroleum ether, the precipitate filtered, washed with diethyl ether, and dissolved in absolute methanol. To neutralize the graft polymer and remove the potassium ions, a stoichiometric equivalent of tartaric acid was added. K-monotartarate precipitated out and was filtered off or centrifuged. The methanolic solution of the graft polymer was partially concentrated in vacuo at less than 40° C. and dry acetone was added to precipitate the graft polymer. The yield of the graft polymer was 85 percent, 4.1 g.

In a duplicate experiment, the methanolic solution of the graft polymer was heated more strongly, i.e., at 80° C., and the graft polymer became insoluble. After being washed with acetone and filtered, there was obtained a yield of 4.83 g. (100%).

Example 2

A 2.43 g. portion of the same starch used for Example 1 was dissolved in 65 ml. dimethylsulfoxide. The solution was dried by evaporating part of the high boiling solvent in vacuo. Potassium naphthalene (4.65 mmole) in tetrahydrofuran was added. The alkoxide formed was reacted in the cold (5° C.) with ethylene oxide (6 g.; 75 mmole). The ratio of ethylene oxide monomer to alkoxide was 16.1. The reaction mixture was stirred for several hours in the cold and left overnight. The reacted mixture was diluted with benzene and precipitated with petroleum ether. The precipitated ethylene oxide-grafted starch alkoxide was filtered, washed with diethyl ether and dissolved in methanol. The solution was neutralized with tartaric acid in methanol, and the precipitated potassium tartarate was removed by filtration. The methanol was driven off in vacuo at less than 40° C., and the graft polymer was precipitated by acetone, yield 4.7 g. (55%). The starch content of the graft polymer was ascertained as being 48% by titration with iodine and alkali of the glucose liberated during 2 hours of refluxing with 2 N HCl.

Example 3

To 50 ml. of the same stock solution used in Example 1 was added 14.1 ml. (13.95 mmole) of the 0.98 N solution of potassium naphthalene in tetrahydrofuran. The alkoxide derivative formed was cooled to about 5° C. and 1.8 g. of ethylene oxide (41 mmole) was bubbled in with stirring. The ratio of ethylene oxide monomer to alkoxide was 2.94. The graft polymer was isolated as in Example 1, yield 100%. The polymer analyzed 32.5% ethoxyl.

Example 4

To 41.15 ml. of the water-free, distilled stock solution of Example 1 containing 2.0 g. of the soluble starch, potassium naphthalene, 7.05 ml. (1.75 N solution), in THF was added. To the alkoxide derivative formed, propylene oxide (5 ml.; 71.5 mmole) was added at 20° C. The ratio of propylene oxide monomer to alkoxide was 5.8. The reaction mixture was stirred for 1 hour and left to stand for 2 days. Benzene, about 150 ml., was added, followed by about 200–240 ml. petroleum ether. The grafted alkoxide derivative precipitated out and the solvent mixture was removed by decantation.

Benzene, about 100 ml., was added to the precipitated derivatized starch graft and the latter precipitated once more by the addition of about 105 ml. of petroluem ether. The graft polymer was resuspended in benzene, and then acetic acid dissolved in about 3 ml. diethyl ether was added with strong stirring to neutralize the alkoxide. Petroleum ether, 150–200 ml., was added to precipitate the crude graft polymer contaminated with potassium acetate; the yield of the crude graft polymer was 68 percent.

To purify the graft polymer from the potassium acetate, the crude graft polymer was dissolved in methanol (about 10% solution) and precipitated by ether. The graft polymer was less soluble in the methanol-ether mixture than the potassium acetate and precipitated before the latter. The potassium acetate precipitated only on addition of further amounts of ether, so that the pure graft polymer was readily separated from the potassium acetate. Alternatively, a methanol solution of the crude graft polymer is readily purified by dialysis through cellophane, the potassium acetate passing into the external methanol phase.

The pure graft polymer was obtained in 53% yield. The graft polymer melted in the range 100–120° C. It dissolved in cold water to the extent of 13.3 g./100 ml. It had a similar solubility in methanol, but only 8 g. of the polymer could be dissolved in 100 ml. of ethanol.

The graft polymer was composed of 40% starch as found by quantitative analysis of the glucose present in the acid hydrolysate of the graft polymer.

Example 5

To 50 ml. of water-free DMSO solution containing 2.0 g. of the soluble starch were added 22.5 ml. of 0.92 N potassium naphthalene, with strong stirring. Propylene oxide (10 ml.; 143 mmole) was added to the starch alkoxide. The ratio of propylene oxide monomer to alkoxide was 6.92. The reaction mixture was stirred for 2 hours and left at room temperature for 2 days. The graft polymer was isolated by precipitation as described in Example 4. The yield of crude graft polymer was 49%. The pure graft polymer had a melting point in the range of 72–82° C. and was found to comprise 16.2% starch. Its solubility in water was 5 g./100 ml., in methanol 8 g./100 ml., and in ethanol 4 g./100 ml.

Example 6

To 50 ml. of the same dry stock solution of Example 5 were added 22.5 ml. of 0.92 N potassium naphthalene solution (20.1 mmole) with strong stirring. Propylene oxide, 5 ml. (71.5 mmole), was added to the starch alkoxide at 40° C. The ratio of propylene oxide monomer to alkoxide was 3.45. The reaction mixture was stirred at 40° C. for 2 hours and left at room temperature for 2 days. The graft polymer was isolated as described in Example 4. The yield of crude graft polymer was 63 percent and that of the pure graft polymer was 32 percent. The pure graft polymer contained 33.6 percent starch; its melting range was 125–135° C. and its solubilities per 100 ml. of solvent were respectively 13.3 in water, 20 g. in methanol, and 10 g. in ethanol.

Example 7

A stock solution of dextrin in dimethylsulfoxide was prepared and freed of water by azeotropic distillation with benzene: 50 ml. of this solution containing 2 grams of dextrin was reacted with 16 ml. of 1.17 N potassium naphthalene in tetrahydrofuran. Propylene oxide (3 ml., 43 mmole) was then added at room temperature with strong stirring. The ratio of propylene oxide monomer to alkoxide was 2.3. The reaction mixture was stirred for 2 hours. The dextrin alkoxide propylene oxide graft polymer was isolated by adding benzene to the reaction mixture and precipitating with petroleum ether (yield 70.6%). The crude graft polymer was dissolved in methanol (1 g./10 ml. solvent). Acetic acid was added to pH 7 and the pure graft polymer precipitated by the addition of ether (yield 65%). The graft polymer contained 35.8% glucose. Its melting point was approximately 140° C. Its solubility in either water or in methanol was 26.7 g./100 ml. and in ethanol 11.8 g./100 ml.

Example 8

To 50 ml. of a dry DMSO solution containing 2.76 g. of soluble starch, 16 ml. of 1.17 N potassium naphthalene solution were added with strong stirring. Butylene oxide (6 ml.; 69.2 mmole) was added to the resulting starch alkoxide at 20° C. The ratio of butylene oxide monomer to alkoxide was 2.71. The reaction mixture was stirred for 2 hours and left at room temperature for 2 days. The butylene oxide graft of the starch alkoxide was isolated by adding benzene to the reaction mixture and then precipitating with petroleum ether (54.5% yield). The alkoxide derivative of the graft polymer was dissolved in methanol (1 g./10 ml. solvent). Acetic acid was added to pH 7 and the pure graft polymer precipitated by addition of ether (yield 24.7%). The melting point range of the graft polymer was 140–145° C. Its solubility in water was 2.5 g./100 ml., in methanol 6.5 g./100 ml., and the same in ethanol.

Example 9

To a water-free DMSO solution containing 2.76 g. of the same starch used in all excepting Example 7 were added 16 ml. of the 1.17 N potassium naphthalene solution with strong stirring. Epichlorohydrin, 5 ml. (64.0 mmole), was added to the alkoxide derivative at 20° C. The ratio of monomer to alkoxide was 3.43. The reaction mixture was stirred for 2 hours and left at room temperature for 2 days. The pure graft polymer was precipitated as follows: Adding 200 ml. benzene and 0.15 ml. acetic acid, followed by 300 ml. petroleum ether. After decanting the solvent mixture, a mixture of methanol-ether (1:3) was added to the precipitate, which was then filtered and washed with ether. The yield of the pure graft polymer was 64.0%. The graft polymer contained 28.3% glucose. The graft polymer was insoluble and infusible.

Example 10

To the same amount of the starch (2.76 g.) in dried DMSO was added 16 ml. of the 1.17 N potassium naphthalene. Vinyl cyclohexene diepoxide (5 ml.; 36.3 mmole) was then added to the starch alkoxide at 20° C. The ratio of diepoxide monomer to alkoxide was 1.95. The reaction mixture was stirred for 2 hours and left at room temperature for 2 days. The yield of graft polymer, isolated as before, was 95%. This graft polymer was insoluble and infusible.

Example 11

2.0 g. of the same starch used in the previous examples was dissolved in dimethylsulfoxide, and the solution was dried. Potassium naphthalene, 16 ml. (1.17 N), was added with strong stirring. Styrene oxide (6 ml.) was added to the starch alkoxide solution at 50° C. The reaction mixture was stirred for 4 hours at 70°C. and the solution became darker. The graft polymer was isolated by adding a mixture of 130 ml. ethanol and 75 ml. petroleum ether containing enough acetic acid for neutralizing the alkoxide. The precipitate was filtered and washed with alcohol and petroleum ether. Yield of pure graft polymer was 32.5%. The pure graft polymer had a melting range of 210–220° C.

Example 12

To 50 ml. of dried DMSO solution of the soluble starch (3.4 g.) was added 24.5 mmole of potassium napthalene. The alkoxide derivative formed was cooled to about 5° C. and ethylene oxide (1.5 g.; 34.1 mmole) was bubbled in. Then after 1 hour, propylene oxide (1.25 g.; 21.5 mmole) was added; the reaction mixture was then stirred for 1 hour and left overnight. The starch alkoxide block graft copolymer, which was precipitated by benzene-petroleum ether as in Example 1, was found to be partially soluble in methanol and completely soluble in water. A methanol extract of the graft polymer was neutralized with tartaric acid, the potassium tartarate precipitate removed by filtration, and the methanol evaporated. Addition of acetone coagulated the neutralized graft polymer. Yield of graft polymer obtained from the methanol extract was 45%. The graft polymer contained 53% starch. The melting point was 140–150° C. Solubility of the graft polymer in water was 17 g./100 ml.; in methanol 42.0 g./100 ml. Similarly, a graft polymer was obtained under the same conditions excepting that the order of adding the two alkylene oxides was reversed. The yield of the methanol soluble fraction of the reversed order graft block copolymer was 50%. It analyzed 53% starch and melted at 85–95° C.

Example 13

Alcohol-precipitated white dextrin (3.25 g.) was dissolved in DMSO and the solution was distilled azeotropically. The dry solution was then reacted with potassium naphthalene (24.5 mmole). The reacted mixture was cooled to 5° C. and ethylene oxide (1.5 g.; 34.1 mmole) was bubbled in. The reaction mixture was stirred for 1 hour, and propylene oxide (1.25 g.) then was added. The crude block copolymer was isolated as in Example 12, then dissolved in methanol, and neutralized with tartaric acid. The methanol was evaporated, and the graft block copolymer was precipitated by acetone. The yield was 4.8 g. (75%). The melting range was 118–124° C. Its solubility in water was 15 g./100 ml.

On carrying out the above experiment under the same conditions except that propylene oxide was reacted first and was followed by ethylene oxide, the block copolymer was obtained in 100% yield. The melting range was 120–130° C., and its solubility in water was 3 g./100 ml.

Example 14

To 40 ml. of anhydrous DMSO containing 3.3 g. of dissolved corn starch, 20 ml. of 1.16 N solution of potassium naphthalene (23.2 mmole) in THF were added and stirred at room temperature. Then 6.0 ml. (85 mmole) of propylene oxide were added, the reaction mixture was stirred for 2 hours, and left for a day at room temperature. The reaction mixture was then diluted with benzene (70 ml.), and the alkoxide derivative of the graft polymer was precipitated by adding 200 ml. of a 1:1 mixture of petroleum ether-diethyl ether. The polymer was filtered and washed with ether, yield 6.9 g. (75%).

On repeating the experiment, an 83.0% yield of the alkoxide derivative of the starch-propylene oxide graft polymer was obtained.

Example 15

To a solution of wheat starch (3.8 g.) in dimethylsulfoxide (50 ml.), potassium naphthalene (20 ml., 1.16 N solution, 23.3 mmole) was added with strong stirring. Propylene oxide (6 ml.; 85 mmole) was added at room temperature. The reaction mixture was stirred for 2 hours and left for a day at room temperature. The reaction mixture was diluted with benzene, and the alkoxide derivative of the starch-propylene oxide-graft polymer was precipitated by the addition of petroleum ether-ether (1:1). The yield of dry polymer was 6.2 g. (64%).

Example 16

To a dry solution of soluble starch (2.14 g.) in dimethylsulfoxide (50 ml.), a 5.05 N solution of potassium methoxide in methanol (3.16 ml.; 15.9 mmole) was added with strong stirring. The alkoxide derivative of the starch was formed and the solution became jelly. To assure complete removal of the methanol, the solution was distilled by gently heating the solution in vacuo, also removing 5 ml. of the higher boiling DMSO. Propylene oxide (5 ml.; 71.5 mmole) was added, and the graft polymerization was carried out at room temperature. The reaction mixture was stirred for 1 hour, and left overnight. The crude graft polymer was precipitated by a mixture of benzene-petroleum ether, and the upper liquid was decanted. The crude polymer was suspended in benzene, neutralized by addition of an equivalent of acetic acid dissolved in a small volume of ether, and precipitated by a large volume of ether. The crude graft polymer was collected, yield 4.1 g. It was dissolved in methanol, the solution placed in a cellophane dialysis bag and the latter suspended in a methanol bath to remove the potassium acetate. Such dialyses completely removed the potassium acetate. The pure starch-propylene oxide graft polymer melted at 180–190° C. It had a solubility of about 40 g./100 ml. in water and the same in methanol. The starch graft polymer, unlike ungrafted starch, did not give the blue color reaction with iodine.

Similar graft polymers of starch-polypropylene oxide were obtained with the starch alkoxide produced by reacting starch with trimethyl benzyl ammonium methoxide in methanol (40% solution).

$$\text{Starch—OH} + C_6H_5CH_2(CH_3)_3\text{—N}^+\text{O}^-\text{CH}_3 \rightarrow$$
$$\text{Starch—O}^-\text{N}^+(CH_3)_3CH_2C_6H_5 + CH_3OH$$

The methanol was completely removed in vacuo, and the propylene oxide graft polymer formed as usual.

Similar graft polymers of starch-polypropylene oxide were obtained on using trimethyl benzyl ammonium hydroxide in water (40% solution) for the formation of the quaternary ammonium derivative. The water was completely removed in vacuo prior to the addition of the propylene oxide.

We claim:

1. Polyalkylene oxide graft polymers and block graft copolymers of alkoxide derivatives of polysaccharides selected from the group consisting of unmodified starches, soluble starches, and dextrins, said graft polymers and block graft copolymers being the products formed by sequentially reacting in a water-free aprotic solvent selected from the group consisting of tetrahydrofuran, dimethyl sulfoxide, dioxan, and mixtures thereof, about 13 mmoles to about 72 mmoles (per gram of original unmodified polysaccharide) of at least one monomeric alkylene oxide selected from the group consisting of ethylene oxide, propylene oxide, butylene oxide, styrene oxide, epichlorohydrin, and vinyl cyclohexane diepoxide with an alkoxide derivative of a said polysaccharide, said alkoxide derivative being the product formed by reacting a said polysaccharide in an aprotic solution selected from dimethyl sulfoxide, tetrahydrofuran, and mixtures thereof with a alkoxylating agent selected from the group consisting of potassium naphthalene, potassium methoxide, trimethyl benzyl ammonium hydroxide, and trimethyl benzyl ammonium methoxide, said graft polymers and block graft copolymers being characterized by being highly soluble in water and in lower alcohols.

2. Graft polymers and block graft copolymers as defined in claim 1 from which the chemically bound potassium ions have been removed by subjecting a methanol solution of the graft polymer or block graft copolymer to dialysis or to neutralization with an organic acid selected from the group consisting of acetic acid and tartaric acid.

3. A polyalkylene oxide graft polymer as defined in claim 1 wherein the polysaccharide is soluble starch, the alkoxide derivative is the product formed by reacting said starch with potassium naphthalene in a dimethyl sulfoxide-tetrahydrofuran mixed solvent, the alkylene oxide is ethylene oxide which has been reacted in an amount corresponding to about 22 mmoles per gram of original unmodified polysaccharide.

4. A polyalkylene oxide graft polymer as defined in claim 1 wherein the polysaccharide is soluble starch, the alkoxide derivative is the product formed by reacting said starch with potassium naphthalene in a dried dimethyl sulfoxide-tetrahydrofuran mixed solvent, the alkylene oxide is propylene oxide that has been reacted in an amount corresponding to about 72 mmoles per gram of original polysaccharide.

5. A polyalkylene oxide graft polymer as defined in claim 1 wherein the polysaccharide is dextrin, the alkoxide derivative is the product formed by reacting the dextrin with potassium naphthalene in a dried dimethyl sulfoxide-tetrahydrofuran mixed solvent, the alkylene oxide is propylene oxide which has been reacted in an amount corresponding to about 22 mmoles per gram of the original umnodified polysaccharide, and wherein the methanol solution of the thereby produced graft polymer has been neutralized with acetic acid to remove the chemically bound potassium therefrom, the resulting alkoxide-free graft polymer being characterized by a melting point of about 140° C. and by being soluble to the extent of about 27 g. in 100 ml. of either water or methanol.

6. A polyalkylene oxide graft polymer as defined in claim 1 wherein the polysaccharide is soluble starch, the alkoxide derivative is the product formed by reacting soluble starch with potassium naphthalene in a dried dimethyl sulfoxide-tetrahydrofuran solvent mixture, the alkylene oxide is butylene oxide which has been reacted in an amount corresponding to about 25 mmoles per gram of the original unmodified polysaccharide, and wherein a methanol solution of the thereby produced graft polymer has been neutralized with acetic acid, the resulting alkoxide-free graft polymer being characterized by a melting point range of 140–145° C. and by being soluble to the extent of about 2.5 g. in 100 ml. of water and to the extent of about 6.5 g. in the same amount of methanol or ethanol.

7. A polyalkylene oxide graft block copolymer as defined in claim 1 wherein the polysaccharide is soluble starch, the alkoxide derivative is the product formed by reacting the soluble starch with potassium naphthalene in a dried dimethyl sulfoxide-tetrahydrofuran solvent mixture, the alkylene oxides are ethylene oxide and propylene oxide that have been reacted sequentially in amounts corresponding respectively to about 10 mmoles and about 6 mmoles per gram of original unmodified polysaccharide, and wherein a methanol solution of the thereby produced graft block copolymer has further been neutralized with tartaric acid and the potassium tartarate precipitate removed, the potassium-free graft block copolymer being characterized by a melting range of 140–150° C., and by being soluble in 100 ml. of water to the extent of 17 g. and in methanol to the extent of 42 g. per 100 ml.

8. A polyalkylene oxide graft polymer as defined in claim 1 wherein the polysaccharide is soluble starch, the alkoxide derivative is the product formed by reacting the soluble starch with trimethyl benzyl ammonium methoxide in a dried dimethyl sulfoxide methanol solvent mixture that was subsequently distilled azeotropically to completely remove the methanol, the alkylene oxide is propylene oxide that has been reacted in an amount corresponding to about 33 mmoles per gram of original unmodified polysaccharide, and wherein the resulting graft polymer has further been freed of its chemically bound potassium by neutralization with acetic and dialysis.

9. An anionic process for preparing water and alcohol soluble polyalkylene oxide graft polymers and graft block copolymers of a polysaccharide selected from the group consisting of starch, soluble starch, and dextrin comprising reacting the polysaccharide in an aprotic solvent system with an alkoxylating agent selected from the group consisting of potassium naphthalene, potassium methoxide, trimethyl benzyl ammonium hydroxide, and trimethyl benzyl ammonium methoxide to form the alkoxide derivative of the polysaccharide and then reacting the so formed derivative in a dried aprotic solvent system with not less than 13 mmoles and not more than about 72 mmoles, per gram of original unmodified polysaccharide, of a monomeric alkylene oxide selected from the group consisting of ethylene oxide, propylene oxide, butylene oxide, styrene oxide, vinyl cyclohexane diepoxide, and epichlorohydrin.

References Cited
UNITED STATES PATENTS

| | | | |
|---|---|---|---|
| 3,033,853 | 5/1962 | Klug | 260—233.3 |
| 3,037,017 | 5/1962 | Satterly | 260—233.3 |
| 3,341,483 | 9/1967 | Zilkha et al. | 260—17 |

OTHER REFERENCES

Fibres and Plastics, July 1961, "New Graft Cellulose," p. 190.

WILLIAM H. SHORT, *Primary Examiner.*

E. M. WOODBERRY, *Assistant Examiner.*